United States Patent [19]

Brabetz et al.

[11] Patent Number: 4,560,724
[45] Date of Patent: Dec. 24, 1985

[54] AQUEOUS POLYMER DISPERSIONS PREPARATION

[75] Inventors: Hartmut Brabetz; Herbert Eck; Reinhard Jira; Heinrich Hopf, all of Burghausen, Fed. Rep. of Germany

[73] Assignee: Wacker-Chemie GmbH, Fed. Rep. of Germany

[21] Appl. No.: 625,669

[22] Filed: Jun. 28, 1984

[30] Foreign Application Priority Data

Jul. 1, 1983 [DE] Fed. Rep. of Germany ....... 3323804

[51] Int. Cl.$^4$ ............................ C08F 2/20; C08F 4/28; C08F 4/40; C08F 2/38
[52] U.S. Cl. ..................................... 524/734; 524/832; 524/47; 524/48; 524/52; 527/313; 527/314
[58] Field of Search ................... 524/734, 832, 47, 48, 524/52; 527/313, 314

[56] References Cited

U.S. PATENT DOCUMENTS

| | | | |
|---|---|---|---|
| 3,632,535 | 1/1972 | Gramera et al. | 524/734 |
| 4,035,329 | 7/1977 | Wiest et al. | 524/825 |
| 4,219,454 | 8/1980 | Iacoviello et al. | 526/329.5 |
| 4,322,516 | 3/1982 | Wiest et al. | 526/306 |

Primary Examiner—Maurice J. Welsh
Assistant Examiner—Nathan M. Nutter
Attorney, Agent, or Firm—Bierman, Peroff & Muserlian

[57] ABSTRACT

A process for the preparation of aqueous polymer dispersions comprising polymerizing compounds with unsaturated ethylenic bonds at a temperature of 10° to 100° C. in the presence of an at least partially water-soluble free-radical initiator and at least one starch and/or starch derivative and optionally present conventional adjuvants with the starting mixture containing not more than one third of the total monomers and the remaining monomer being added during the polymerization, the initiators being at least one member of the group consisting of hydrogen peroxide, ketone peroxides and organic hydroperoxides in an amount of at least 30 mmol per kg of total monomer mixture and optionally present water-soluble reducing agents and the starch is water-soluble or gells in water and contains not more than 30% by weight of amylose and the starch derivative is hydrolyzed starch in an amount of at least 0.6% by weight based on the total monomer weight.

9 Claims, No Drawings

AQUEOUS POLYMER DISPERSIONS PREPARATION

STATE OF THE ART

The use of starch or starch derivatives as protective colloids for the preparation of aqueous polymer dispersions has been proposed in the art. For example, a process for the preparation of aqueous vinyl acetate polymer dispersions is described in European Pat. No. A-21 542 wherein the monomer and the initiator are added to an aqueous solution of an emlsifying agent and hydroxyethyl starch and/or hydroxypropyl starch with a degree of substitution exceeding 0.8.

U.S. Pat. No. 3,632,535 describes the preparation of aqueous vinyl acetate polymer dispersions in the presence of certain oxidized starches. The use of other starch derivatives is expressly discouraged since the resulting products would have unsatisfactory characteristics. Since the presence of an emulsifying agent is undersirable for various uses of polymer dispersions, a process for the preparation of aqueous polymer dispersions that will work without the addition of emulsifying agents for the polymerization is desired.

OBJECTS OF THE INVENTION

It is an object of the invention to provide a process for the polymerization of all well-known monomers to obtain dispersions free of grit and coagulum, which have the stability also required today against, e.g., shearing, temperature influence, electrolyte addition and perferably, the dispersions have a solids contents of more than 40 weight %.

It is another object of the invention to provide a process for the preparation of aqueous polymer dispersions free of emulsifiers.

These and objects and advantages of the invention will become obvious from the following detailed description.

THE INVENTION

The process of the invention for the preparation of aqueous polymer dispersions comprises polymerizing compounds with unstaturated ethylenic bonds at a temperature of 10° to 100° C. in the presence of an at least partially water-soluble free-radical initiator and at least one starch and/or starch derivative and optionally present conventional adjuvants with the starting mixture containing not more than one third of the total monomers and the remaining monomer being added during the polymerization, the initiators being at least one member of the group consisting of hydrogen peroxide, ketone peroxides and organic hydroperoxides in an amount of at least 30 mmol per kg of total monomer mixture and optionally present water-soluble reducing agents and the starch is water-soluble or gells in water and contains not more than 30% by weight of amylose and the starch derivative is hydrolyzed starch in an amount of at least 0.6% by weight based on the total monomer weight.

Examples of compounds with ethylenic unsaturation are optionally substituted styrene, (meth)acrylates with branched or straight-chain, saturated alcohols of 1 to 18 carbon atoms, (meth) acrylonitrile, dienes, vinyl or allyl esters of aliphatic, araliphatic or aromatic carboxylic acids of 1 to 19 carbon atoms and vinyl halides. They can in many cases be polymerized individually or, if the parameters of copolymerization permit, copolymerized in admixture, if needed with other monomers, especially with alkenes such as ethylene, propylene or isobutylene, with acrylic acid, methacrylic acid, itaconic acid, crotonic acid, fumaric acid, and maleic acid, their mono- and/or diesters with the alcohols mentioned above, their amides or nitriles.

Vinyl sulfonates, monoesters of di- or polyhydroxyl compounds with (meth)acrylic acid or crotonic acid, N-vinyl-2-pyrrolidone, vinyl-pyridine, N-vinyl lactones, vinyl- or allyl(di)acetyl acetate, vinyl- or (meth-)acryloylalkoxy silanes, vinyl or allyl compounds of glycidyl alcohol, α-chloroalkylcarboxylic acids and dichlorotriazines as well as olefinically unsaturated N-methylol amides such as N-methylol (meth) acrylamide, N-methylol allyl carbamate, N-methylol allyl ether, Mannich bases, N-methylol ester and N-methylol ether of N-methylol (meth)acrylamide may also be used as comonomers.

Examples of bi- polyfunctional comonomers include: divinyl and diallyl ethers of glycols, divinyl and diallyl esters of saturated dicarboxylic acids, polyvinyl and polyallyl esters of polycarboxylic acids, di- and polyesters of di- and polyhydroxyl compounds with (meth)acrylic acid, vinyl and allyl esters of (meth)acrylic, crotonic, maleic and fumaric acids and divinyl benzene. The said comonomers can be copolymerized with the initially mentioned monomers or their mixtures if the parameters of copolymerization and the desired characteristics of the dispersion of the copolymer permit.

Examples of monomers that can be homopolymerized or copolymerized according to the invention include styrene, chlorostyrene, methylstyrene, methyl (meth)acrylate, ethyl (meth)acrylate, propyl (meth)acrylate, butyl (meth)acrylate, ethylhexyl (meth)acrylate, lauryl (meth)acrylate, butadiene, isoprene, cyclobutadiene, vinylidene chloride, vinyl formate, vinyl acetate, vinyl propionate, vinyl hexanoate, vinyl laurates, vinyl stearate, the allyl esters corresponding to the mentioned vinyl esters, vinyl esters of alkyl carboxylic acids branched in the α position, which are prepared by the so-called Koch synthesis (esters of Versatic ® acids, Shell AG), vinyl fluoride, vinyl chloride and vinyl bromide.

Suitable at least partially water-soluble, free-radical initiators which are added as redox-initiator system, preferably in combination with water-soluble reducing agents, are hydrogen peroxide; ketone peroxides, particularly acetylacetone peroxide; and/or organic hydroperoxides with the use of alkyl hydroperoxides of up to 8 carbon atoms and/or aralkyl hydroperoxides of 6to 15 carbon atoms being preferred. Specific initiators include isopropyl hydroperoxide, tert-.butyl hydroperoxide, cumene hydroperoxide, diisopropylphenyl hydroperoxide, pinane hydroperoxide, p-nitrocumene hydroperoxide, p-tert.-butylphenyl hydroperoxide, tert-amyl hydroperoxide, 2,5-dimethyl-hexan-2,5-dihydroperoxide.

Preferred reducing agents include reducing sulfur compounds, especially salts of sulfoxylic acid and sulfurous acid, as well as ascorbic acid. Sodium and zinc formaldehyde sulfoxylate, sodium bisulfite and sodium sulfite are specific preferred sulfur compounds.

The said oxidizing and reducing agents can be used alone or as mixtures and the oxidizing component is preferably used in an excess with respect to the reducing component. This may be achieved e.g., by placing the oxidizing agent completely or partly in the reaction vessel and metering in the reducing agent and, if appropriate, the remainder of the oxidizing component, preferably at the rate at which they are consumed during the polymerization. However, it is understood that both components of the redox system can also be added by metering during polymerization.

The peroxide initiator is used in amounts of at least 30 mmol, preferably at least 45 mmol, per kg of the total monomer mixture and the amount of the optionally used reducing agent is preferably 15 to 95 mol %, especially 80 mol %, calculated with respect to the peroxide compound. In this case, the water and the reaction components and compounds dissolved or dispersed in it are called the reaction mixture. The upper limit of the concentration of the initiator depends on the type of monomer used and especially on the chosen reaction temperature and the intended degree of polymerization. The protective colloid also has a certain influence on the amount of initiator to be used but the optimal amounts can be readily determined by a few preliminary experiments. Generally, 2 weight %, calculated with respect to the total amount of monomers, will be adequate.

Useful protective colloids, singly or in mixture but preferably singly, are starches soluble in water or starches that gell in water, so-called gel starches, and/or degradated starches, perferably starches degradated by hydrolysis, especically by acid hydrolysis, which often are also called dextrins.

The gel starches are not chemically modified, i.e., e.g. not etherified or esterified, but are simply made water-soluble or to gell in water e.g. by boiling the original starches with water. With one exception, which will be explained in more detail below, no special requirements must generally be observed in the choice of the native or original starches. Thus, practically all starches of plant origin can be used singly or as mixture in the invention, after the heart treatment described above. Only starches from corn, wheat, potatoes, tapioca, rice, sago and sorghum shall be mentioned as examples. However, starches rich in amylose are unsuitable in contrast to the starches rich in amylopectin. Suitable starches are those that contain not more than 30% of amylose. Suitable hydrolyzed starches are dextrins from practically all sources of starch such as the plants mentioned above. The preparation of the dextrins by acid hydrolysis are well known to those skilled in the art and besides many of the starches and starch derivatives to be used in the invention are available commerical products.

The protective colloids of a starch or starch derivative described above are used in amounts of at least 0.6 weight % perferably at least 0.9 weight %, calculated with respect to the total weight of the monomer mixture. Preferred is the addition of at least 0.5 weight % of these protective colloids, calculated with respect to the total monomer, as the minimum amount of starch or starch derivative necessary for the stabilization of the entire batch, to the reaction mixture before the beginning of the polymerization.

The viscosity of the final dispersion can be determined very simply by the amount of protective colloid placed in the reaction vessel for a given protective colloid and given temperature, e.g., the viscosity can be greatly increased by adding initially the total amount of starch or dextrin, or lowered by increasing the amount of protective colloid during polymerization. The upper limit of the amount of protective colloid is determined by the intended use of the final polymer dispersion and not by the polymerization process of the invention. Obviously, the viscosity of the starch also limits the amount that can be used and this becomes apparent, e.g., from the fact that this limit can be further extended by the use of kneading units for the polymerization.

"Highly viscous" types of starch can be used, e.g., preferably in amounts of up to 3 weight % while types with very "low viscosity", e.g. thin-boiling types of yellow dextrin can be used preferably in amounts up to 100 weight %, especially up to 50 weight %, calculated with respect to the total monomer weight. Types of "medium viscosity" between those mentioned can be used in amounts from preferably 0.8 to 50 weight %. Some types of starch are known to inhibit polymerization. They are preferably avoided or used only in small amounts and it is advisable to test their suitability in a small-scale preliminary trial.

The polymerization process of the invention is performed at 10° to 100° C., preferably 35° to 80° C., and preferably at pressures of up to 200 bar. When no ethylene is used, the polmerization is preferably performed at not more than the autogenous pressure of the monomers at the selected reaction temperature. When ethylene is used, pressures of up to 100 bar are adequate in an especially preferred practical example.

When ethylene is used in the polymerization, it can be placed completely in the reaction vessel at the start, or part of it can be added during polymerization. A specific, desired pressure is preferably set before the polymerization and then kept contstant throughout the polymerization, if needed by further addition of ethylene under pressure. Naturally, the ethylene pressure can be varied during the polymerization reaction, if this is desired such as for the preparation of polymers varying composition.

The other monomers or comonomers are placed in the reaction vessel at the beginning in amounts not exceeding one third % of the total weight with the remainder being added during the polymerization, preferably at the rate of consumption. The addition can be separately, as a mixture and/or as a pre-emulsion. Maintaining the total monomer concentration of these other monomers in the reaction mixture below 20 weight %, preferably at not more than 15 weight %, of the total weight of the reaction mixture was also found to be advantageous. When ethylene is copolymerized, particularly when copolymers with more than 10 weight % ethylene units added by polymerization are desired, the total concentration of these other comonomers, i.e. of the unsaturated esters, halogen substituted ethylenes etc., is kept preferably at not more than 10 weight %, especially not more than 5 weight %, of the total weight of the reaction mixture. The monomers may be added individually, mixed and/or as pre-emulsion or, if needed, as aqueous solutions.

Other optional conventional adjuvants used in the usual amounts are molecular weight regulators, protective colliods such as polyvinyl alcohols such as partially saponified polyvinyl acetate, cellulose derivatives and similar substances and emulsifying agents. However, these dispersing adjuvants and dispersion stabilizers are added, if at all, to the final dispersion after the end of the polymerization since they may otherwise frequently enter in an undesirable manner into the polymerization or modify the products in an undesirable way. Upon the completion of the polymerization, other usual adjuvants can be added in the usual amounts to the dispersions obtained by the invention and include film-forming adjuvants, softening agents, pesticides, stabilizers against thermal or electromagnetic damage a.m.m.

The dispersions prepared by the invention can be used as such for the preparation of adhesives such as especially paper, foil, water resistant wood glues, as paint, textile or paper filler, in the construction industry such as adjuvant to hydraulically setting materials, espeically stable cement and concrete materials, but particularly for the preparation of redispersible plastic powders. These powders are produced by spray-drying or drum-drying or suction-filter-drying by known procedures and thus do not need to be described here in detail with the use of the powders, based on the dispersions of the invention. However, the polymers can also be precipitated or isolted by other known methods.

In the following examples there are described several preferred embodiments to illustrate the invention. However, it should be understood that the invention is not intended to be limited to the specific embodiments.

EXAMPLES

In the following examples reported in the Tables, the amounts and concentrations are by weight and the percentages of the components of the initiator systems, monomers and starch components are calculated on total monomer weight without ethylene and the solids content and remaining monomers are calculated on the total weight of the dispersions. The wet residue is reported in grams per 1.5 kg batch and the viscosities were determined with Brookfield viscosimeter in min$^{-1}$/mPas or with an Epprecht rheometer (beaker and measuring speed are recorded). The mean particle sizes were measured with a Coulter ® Nano-Sizer TM in nm and were recorded after the polydispersity Index P.

Examples 1 to 30 illustrate the process of the invention and Examples A to C are comparison examples to show the advantageous features of the process. Water, starch, if needed portions of the catalyst system, if needed portions of the monomers and, if needed, additives were placed in a cylindrical reaction vessel with a bottom stirree, a reflux condenser, a thermometer and feeding funnels for the initiator, monomer mixture and buffer solution as well as an attachment for the removal of samples. The mixture was stirred to raise it up to the reaction temperature and the remaining monomers, catalyst system and buffer were added by metering over about 2 hours. Upon the completion of the polymerization, the material was allowed to after-polymerize, if needed, for 30 minutes in the known manner with continued addition of a water-soluble initiator.

Metering of the monomers except ethylene was adjusted so that for operating procedure A: the concentration of the monomers in the reaction mixture was maintained between 20 and 15 weight %, for operating procedure B, between 5 and 10 weight %;and for operating procedure C, at barely 5 weight %. Further details of the examples can be found in the following table. The abbreviations are explained below:

| V | placed in the reaction vessel | d. metered |
| --- | --- | --- |
|  |  | OA 2-ethylhexyl acrylate |
| AA | acrylamide | OF bis(2-ethylhexyl) fumarate |
|  |  | S styrene |
| AB | butyl acrylate | Si vinyl trimethoxysilane |
| AMA | allyl methacrylate | VA vinyl acetate |
| AS | acrylic acid | VC vinyl chloride |
|  |  | VS vinyl sulfonate |
| E | ethylene | Veo VeoVa$^{(R)}$ 10, vinyl-versatat$^{(R)}$ |
| MA | methyl acrylate |  |
| MMA | methyl methacrylate |  |
| HEA | hydroxyethyl acrylate | H$_2$O$_2$ hydrogen peroxide |
| TBHP | tert-butyl hydroperoxide | CHP cumene hydroperoxide |
| DBP | dibenzoyl peroxide | NFS sodium formaldehyde sulfoxylate |
| DTBP | di-tert.-butyl peroxide | NS sodium sulfite |

The commercial starches and dextrins used in the example were:

| I | Gelbdextrin D 3100 (yellow dextrin), thin-boiling (from potato starch); Avebe; |
| --- | --- |
| II | Dexylose D 230, gel starch with high amylopectin content; Roquette; |
| III | relatively high-viscosity corn dextrin; Roquette, BCF Colle; |
| IV | low-viscosity corn dextrin DF 2600; Roquette; |
| V | native potato starch; Roquette; |
| VI | Gelbdextrin 30AN45 (from potato starch); Avebe; |
| VII | Dextrin W50, Weissdextrin (white dextrin), thin-boiling (from potato starch); Avebe; |
| VIII | Dexylose D 215, cf. II, but low viscosity; |
| IX | Glacelys, gel starch; Roquette; |
| X | native wheat starch; Roquette; |
| XI | Nylgum A55, low viscosity; Avebe; |
| XII | Nylgum A85, medium viscosity; Avebe; |
| XIII | Nylgum A160, high viscosity; Avebe; |
| XIV | Waxylys 100, rich in amylopectin, native starch from soft corn; Roquette. |
| XV | Eurylon, starch product rich in amylose; Roquette. |

TABLE

| No. | Monomers (%) | Type of starch (%) | Catalyst System (%) | Operating procedure | T (°C) | pH | FG (%) | R.M. (%) | N.R. (g) | Spreading | p/(nm) | Viscosity (mPas) CI | (mPas) CII | (mPas) CIII |
|---|---|---|---|---|---|---|---|---|---|---|---|---|---|---|
| 1 | VA(99.3d);VS(0.5v u. 0.2d) | I (8v) | TBHP(0.9v);NFS u. NS (je 0.3d) | B | 70 | 3.3 | 55.7 | 0.3 | — | very clear | 0/345 | 105 | 66 | — |
| 2 | VA(99.3d);VS(0.7d) | I (8v) | TBHP(0.9v);NFS u. NS (je 0.3d) |  | 70 | 4.2 | 53.2 | 0.4 | — | very clear | 3/350 | 58 | 44 | 39 |
| 3 | VA;d | II (0.75v) I (0.25v) | TBHP(0.9v);NFS u. NS (je 0.3d) | C | 67 | 4.2 | 51.5 | 0.2 | 3.2 | clear | 4/600 | 2744 | 1232 | 584 |
| 4 | VA(98d);AS(2d) | II (1.5v) | TBHP(0.9v);NFS u. NS (je 0.35d) | B | 70 | 4.1 | 53.3 | — | — | clear | — | — | — | — |
| 5 | S(50);OA(40);OF(8.3)AS (0.3)AA(0.6;Si(0.5); | I (8v) | TBHP(0.9v);NFS u. NS (je 3d) | A | 75 | 3.5 | 55.0 | 0.4 | 5.0 | clear | 2/350 | 35 | 26 | 25 |
| 6 | S(40);AB(60);d | I (8v) | TBHP(0.9v);NFS u. NS (je 0.6d) | B | 70 | ~2.8 | 48.9 | 0.7 | 5.0 | clear | 3/250 | 106 | 65 | 47 |
| 7 | AB;d | I (4v) | H₂O₂(0.2v);NFS u. NS (je 0.2d) | B | 73 | 2.6 | 51.0 | 0.2 | 6.0 | very clear | 2/240 | 312 | 174 | 107 |
| 8 | VC(30);VA(70);E(30 bar);d | I (2.3v) II (1.4v) | TBHP(1.2v);NFS(0.4d) | B | 65 | 6.5 | 50.9 | 0 | 1.0 | clear | 7/1300 | 203 | 126 | — |
| 9 | MMA(44);AB(56);d | I (8v) | TBHP(0.9v);NFS u. NS (je 0.35d) | C | 69 | 4.0 | 52.2 | 0.2 | 5.0 | very clear | 1/235 | 65 | 38 | 31 |
| 10 | AB(99.8);AMA(0.2);d | I (4v) | H₂O₂(0.3v);NFS u. NS (je 0.3d) | C | 75 | 2.5 | 52.4 | 0.1 | 5.3 | clear | 4/270 | 312 | 183 | 119 |
| 11 | S(40);AB(60);d | III (8v) | TBHP(1.1v);NFS(0.4d) | C | 70 | 4.3 | 48.9 | 0.9 | — | very clear | 6/2370 | 28560 | 11856 | 7519 |
| 12 | S(40);AB(60);d | IV (8v) | " | C | 75 | 2.9 | 53.7 | 0.3 | — | very clear | 2/291 | 3567 | 1760 | 922 |
| 13 | VA(93.3);AS(1);HEA(5.7); d;E(50 bar);v | I (3.8v) | TBHP;NFS u. NS (je 0.35d) | B | 50 | 3.6 | 48.6 | 0 | 15.0 | very clear | 4/710 | — | 2881 | 1694 |
| 14 | S(50);AB(50);d | IV (2.5v) | TBHP(1.1v);NFS u. NS (je 0.45d) | B | 78 | 3.5 | 50.8 | 3.9 | trace | clear | 5/2780 | 7134 | 3476 | 2274 |
| 15 | VA;d | VI (8v) | TBHP(0.9v);NFS u. NS(je 0.35d) | C | 70 | 4.1 | 55.2 | 0.2 | — | very clear | 0/390 | — | — | — |
| 16 | VA;d | VII (8v) | " | B | 68 | 4.1 | 54.8 | 0.2 | — | clear | 1/350 | 1010 | 445 | 320 |
| 17 | VA;d | I (1v) | " | A | 67 | 4.0 | 48.1 | 0.4 | — | clear | 3/545 | — | — | 85 |
| 18 | VA;d | VIII (2.5v) | " | B | 67 | 3.6 | 46.9 | 0.8 | — | clear | 5/550 | 4528 | 2112 | 1000 |
| 19 | VA;d | IX (2.5v) | TBHP(0.9v);NFS u. NS (je 0.3d) | B | 69 | 4.0 | 47.2 | 0.7 | — | clear | — | — | — | — |
| 20 | VA;d | II (2.5v) | TBHP(1.1v); NFS u. NS (je 0.35d) | B | 69 | 4.3 | 51.7 | 0.3 | — | very clear | 5/485 | 7546 | 3322 | 1598 |
| 21 | VA;d | XIV (2.5v) | TBHP(1.1v);NFS u. NS (je 0.35 d) | B | 70 | 4.3 | 51.5 | 0.3 | — | very clear | 4/470 | 3704 | 1628 | 728 |
| 22 | VA;d | V (2.5v) | TBHP(1.1v);NFS u. NS (je 0.35d) | B | 70 | 5.2 | 52.2 | 0.1 | — | very clear | 2/349 | 4596 | 2068 | 993 |
| 23 | VA;d | X (1.5v) | TBHP(1.1v);NFS u. NS (je 0.4d) | B | 71 | 4.4 | 52.2 | 0.1 | — | very clear | 0/400 | 40 | 39 | 37 |
| 24 | VA;d | XII (4v) | TBHP(0.9v);NFS u. NS (je 0.35d) | B | 68 | 4.4 | 53.0 | 0.1 | — | very clear | 1/630 | *2/31 000 | *10/8960 | *20/5380 |
| 25 | VA;d | XII (4v) | H₂O₂(0.3v);NFS u. NS (je 0.3d) | A | ~70 | 4.7 | 46.3 | 4 | — | very clear | 6/1300 | — | — | — |
| 26 | VA(60) + AB(20) + Veo(5) + MA(13) + AA(1) + AS(1);d | XII (4v) | TBHP(0.9v);NFS u. NS (je 0.3d) | B | 75 | 3.8 | 49.8 | 0.9 | — | clear | 5/1900 | BI 1130 | BII 610 | — |
| 27 | S(50) + AB(50);d | XII (5v) | TBHP(0.9v);NFS u. NS (je 0.2d) | B | 75 | 3.8 | 51.5 | 0.3 | — | clear | 5/3500 | DI 31400 | DII 18700 | DIII 12630 |
| 28 | VA;d | XI (4v) | TBHP(1.1v);NFS u. NS (je 0.3d) | B | 70 | 6.4 | 52.6 | 1.2 | — | clear | 0/394 | *2/ | *10/ | *20/ |

TABLE-continued

| No. | Monomers (%) | Type of starch (%) | Catalyst System (%) | Operating procedure | T (°C.) | pH | FG (%) | R.M. (%) | N.R. (g) | Spreading | p/(nm) | Viscosity (mPas) CI | (mPas) CII | (mPas) CIII |
|---|---|---|---|---|---|---|---|---|---|---|---|---|---|---|
| 29 | VA;d | XIII (4v) | TBHP(1.1v);NFS u. NS (je 0.3d) | B | 70 | 5.6 | 52.3 | 0.9 | — | clear | 4/400 | 2881 *2/ | 1276 *10/ | 648 *20/ |
| 30 | S(50);BA(50);d | XI (4v) | TBHP(1.1v);NFS u. NS (je 0.3d) | B | 79 | 3–6 | 52.5 | 0.7 | 2.2 | clear | 6/1270 | 3842 *2/ | 1782 *10/ | 894 *20/ |
| A | VA;d | XV (2.3v) | TBHP(1.1v);NFS u. NS (je 0.3d) | B | 72 | 4.1 | 51.7 | 0.1 | 31 | many dots | 7/580 | 4047 | 1980 | 1690 |
| B | VA;d | I (8v) | DBP(0.5v) | B | 60 | 4.5 | | | | stopped after ½ hour since typical suspension polymerization | | — | CII47 | CIII52 |
| C | VA;d | I (1v) | DTBP(1.3v);NFS u. NS (je 0.5d) | B | 70 | ~5 | | | | hardly any polymerization; formation of 2 layers | | | | |
| 31 | VA;d | I (8v) | TBHP(0.9d);NFS(0.45d) | B | 70 | 2.4 | 53.6 | 0.06 | — | very clear | 0/305 | AI49 | AII32 | AIII29 |
| 32 | VA;d | I (8v) | TBHP(0.9d);NS(0.5d) | B | 70 | 4.1 | 51.4 | 2.1 | — | very clear | 0/275 | — | AII15 | AIII15 |

Note:
Symbol "u" means "and"
"je" means "each"

The results of the above Table clearly show that the process of the invention results in the preparation of very acceptable aqueous polymer dispersions while the comparative examples resulted in unusable compositions.

Various modifications of the process of the invention may be made without departing from the spirit or scope thereof and it is to be understood that the invention is intended to be limited only as defined in the appended claims.

What we claim is:

1. A process for the preparation of aqueous polymer dispersions comprising polymerizing compounds with unsaturated ethylenic bonds at a temperature of 10° to 100° C. in the presence of an at least partially water-soluble free-radical initiator and at least one starch and or starch derivative and optionally present conventional adjuvants with the starting mixture containing not more than one third of the total nomomers and the remaining monomers being added during the polymerization, the initiators being at least one member of the group consisting of hydrogen peroxide, ketone peroxides and organic hydroperoxides in an amount of at least 30 mmol per kg of total monomer mixture and optionally present water-soluble reducing agents and the starch is water-soluble or gells in water and contains not more than 30% weight of amylose and the starch derivative is hydrolyzed starch in an amount of at least 0.6% by weight based on the total monomer weight.

2. The process of claim 1 wherein the peroxide initiator is used in combination with a member selected from the group consisting of ascorbic acid and reducing sulfur compounds.

3. The process of claim 1 wherein the initiator is at least one member of the group consisting of alkyl hydroperoxides and aralkyl hydroperoxides.

4. The process of claim 3 wherein the peroxide initiator is used in combination with a member selected from the group consisting of ascorbic acid and reducing sulfur compounds.

5. The process of claim 1 wherein the peroxide initiator is present in the starting monomer and polymerization is controlled by addition of reducing agent.

6. The process of claim 1 wherein the amount of starch or starch derivative is at least 0.5% by weight of the monomer mixture before polymerization.

7. The process of claim 1 wherein the amount of initiator is at least 45 mmol per kg of total monomer.

8. The process of claim 1 using 15 to 95 mol % of reducing agent based on the initiator.

9. An aqueous polymer dispersion produced by the process of claim 1.

* * * * *